(12) United States Patent
Ohshima et al.

(10) Patent No.: US 7,986,297 B2
(45) Date of Patent: Jul. 26, 2011

(54) IMAGE DISPLAY APPARATUS UTILIZING ELECTROPHORESIS

(75) Inventors: Tetsuya Ohshima, Tokyo (JP); Hiroki Kaneko, Hitachi (JP); Tatsuya Sugita, Takahagi (JP)

(73) Assignee: Hitachi Displays, Ltd., Chiba (JP)

( * ) Notice: Subject to any disclaimer, the term of this patent is extended or adjusted under 35 U.S.C. 154(b) by 917 days.

(21) Appl. No.: 10/887,365

(22) Filed: Jul. 8, 2004

(65) Prior Publication Data
US 2005/0012709 A1    Jan. 20, 2005

(30) Foreign Application Priority Data
Jul. 14, 2003   (JP) .................................. 2003-196318

(51) Int. Cl.
G09G 3/34   (2006.01)
(52) U.S. Cl. ........................................ 345/107; 359/296
(58) Field of Classification Search .................. 345/107; 359/296
See application file for complete search history.

(56) References Cited

U.S. PATENT DOCUMENTS

| | | | |
|---|---|---|---|
| 4,203,106 A | | 5/1980 | Dalisa et al. |
| 4,218,302 A | | 8/1980 | Dalisa et al. |
| 4,648,956 A | * | 3/1987 | Marshall et al. .............. 359/296 |
| 6,184,856 B1 | | 2/2001 | Gordon, II et al. |
| 6,741,385 B2 | * | 5/2004 | Ikeda et al. .................... 359/296 |
| 6,873,451 B2 | * | 3/2005 | Ukigaya ....................... 359/296 |
| 6,897,996 B2 | | 5/2005 | Ikeda et al. |
| 2001/0030639 A1 | * | 10/2001 | Goden ........................... 345/107 |
| 2002/0005832 A1 | * | 1/2002 | Katase ........................... 345/107 |
| 2002/0067333 A1 | * | 6/2002 | Uno et al. ...................... 345/107 |
| 2003/0011869 A1 | * | 1/2003 | Matsuda et al. .............. 359/296 |
| 2003/0048521 A1 | | 3/2003 | Ikeda et al. |
| 2003/0214479 A1 | * | 11/2003 | Matsuda et al. .............. 345/107 |
| 2004/0135763 A1 | * | 7/2004 | Kaneko et al. ................ 345/107 |
| 2006/0139304 A1 | * | 6/2006 | Goden ........................... 345/107 |

FOREIGN PATENT DOCUMENTS

| | | |
|---|---|---|
| JP | 03022225 A | 3/1991 |
| JP | 2001174853 A | 6/2001 |
| JP | 2002014378 A | 1/2002 |
| JP | 2002-148664 | 5/2002 |
| JP | 2002162650 A | 6/2002 |
| JP | 2002182249 A | 6/2002 |
| JP | 2003161966 A | 6/2003 |

OTHER PUBLICATIONS

Japanese language office action dated Mar. 27, 2008 and its partial English translation for corresponding Japanese application 2003196318 lists the references above.

Japanese language office action dated Aug. 19, 2008 and its partial English translation for corresponding Japanese application 2003196318 lists the references above.

\* cited by examiner

*Primary Examiner* — Alexander S Beck
*Assistant Examiner* — Michael Pervan
(74) *Attorney, Agent, or Firm* — Antonelli, Terry, Stout & Kraus, LLP.

(57) ABSTRACT

Each of first electrodes has a width smaller than the width of each of second electrodes in one direction on the plane of a display substrate. The second electrodes are applied with a voltage which is modulated independently on a pixel-by-pixel basis to move electrophoretic particles, thereby displaying an image.

4 Claims, 12 Drawing Sheets

Prior Art

FIG. 19B

Prior Art

IMAGE DISPLAY APPARATUS UTILIZING ELECTROPHORESIS

BACKGROUND OF THE INVENTION

The present invention relates to an image display apparatus which utilizes electrophoresis.

Figure 19A:
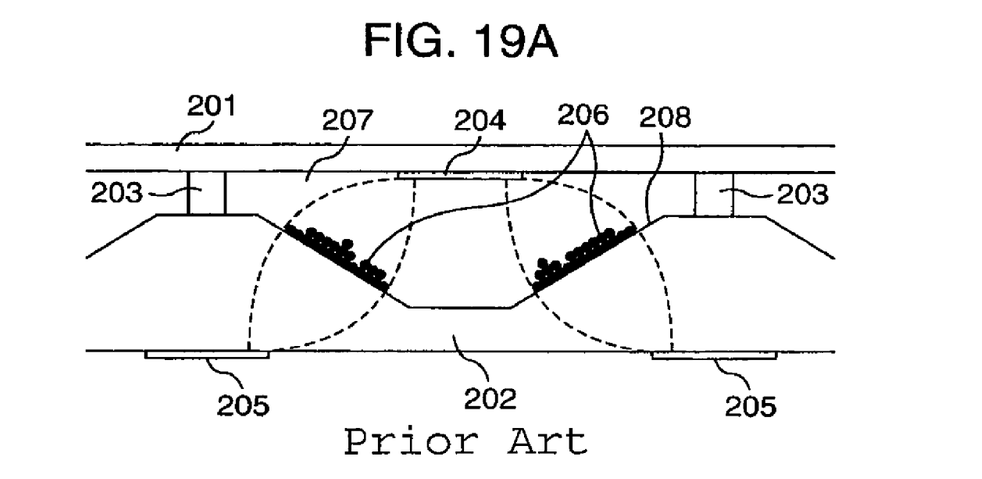
FIGS. 19A and 19B are cross-sectional views generally illustrating the structure of a prior art image display apparatus.
Figure 19B:
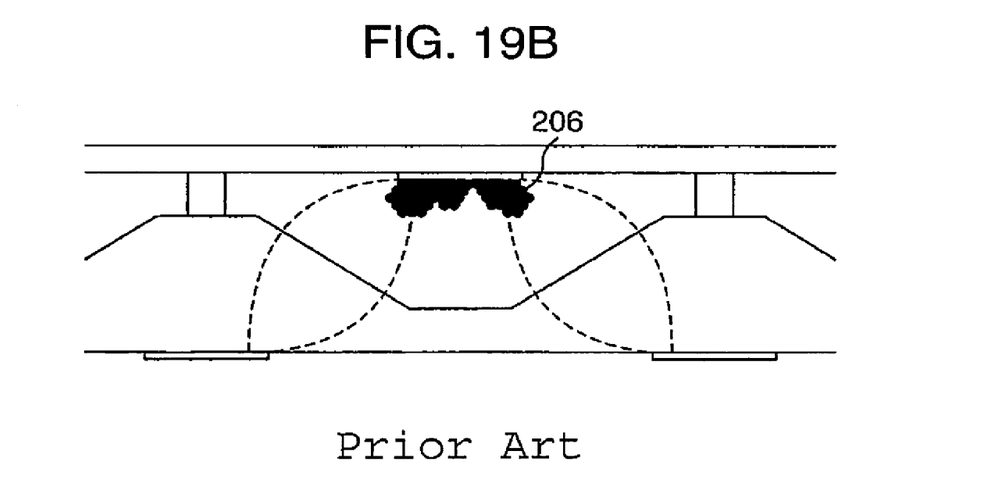

JP-A-2002-148664 describes an image display apparatus as illustrated in FIG. 19 which has a two-dimensional matrix of pixels in which colored particles with zeta potential 206 are dispersed in a light-transmissive fluid 207. The reflectance is varied on a pixel-by-pixel basis through movements of the colored particles with zeta potential controlled by an electric field to display an image.

In the conventional image display apparatus as illustrated in FIG. 19, the colored particles with zeta potential 206 are dispersed in the light-transmissive fluid 207 through a spacer 203. The colored particles with zeta potential 206 are moved by modulating a voltage applied between an electrode 204 disposed on a first substrate 201 and two electrodes 205 disposed on a second substrate 202 to switch between a particle color presented by the colored particles of zeta potential 206 and a background color presented by the second substrate 202 on a pixel-by-pixel basis for displaying an image.

SUMMARY OF THE INVENTION

The conventional display apparatus utilizes an electric field at edges of the electrode 204 disposed on the first substrate 201 and the two electrodes 205 disposed on the second substrate 202, and applies a voltage through the second substrate 202, with the intention of improving the characteristics of the particle color display state for dispersing the colored particles with zeta potential 206 within pixels, resulting in a high voltage required for the operation.

Also, since the second substrate 202 needs an inclined surface 208 of a wall for dispersing the colored particles with zeta potential 206, the resulting second substrate 202 takes a complicated configuration which entails complicated machining and manufacturing.

Further, the two electrodes 205 disposed on the second substrate 202 for control spread across pixels, often causing difficulties in active-matrix driving of each pixel with a thin-film transistor or the like.

To solve the problems mentioned above, it is an object of the present invention to provide an image display apparatus which facilitates the manufacturing, and has the display performance that presents high characteristics of particle color display state.

An image display apparatus according to the present invention, intended to solve the foregoing problem, includes a first substrate formed with first electrodes, a second substrate disposed opposite to the first substrate and formed with second electrodes, and electrophoretic particles and a solvent encapsulated between the first substrate and the second substrate, wherein each electrode belonging to the first electrodes has a width smaller than each electrode belonging to the second electrodes in at least one direction on the plane of the first substrate, and the second electrodes are applied with a voltage which can be modulated independently on a pixel-by-pixel basis, thereby moving the electrophoretic particles to display an image.

Other objects, features and advantages of the invention will become apparent from the following description of the embodiments of the invention taken in conjunction with the accompanying drawings.

BRIEF DESCRIPTION OF THE DRAWINGS

FIGS. 3A, 3B to 8A, 8B are cross-sectional views generally illustrating several possible structures for the image display apparatus according to the present invention;

FIGS. 16A to 16K are diagrams each showing how an electric field is generated within pixels of the image display apparatus according to the present invention;

FIGS. 18A to 18D are diagrams generally illustrating a portable reader which embodies the image display apparatus according to the present invention.

DETAILED DESCRIPTION OF THE EMBODIMENTS

Figure 1A:
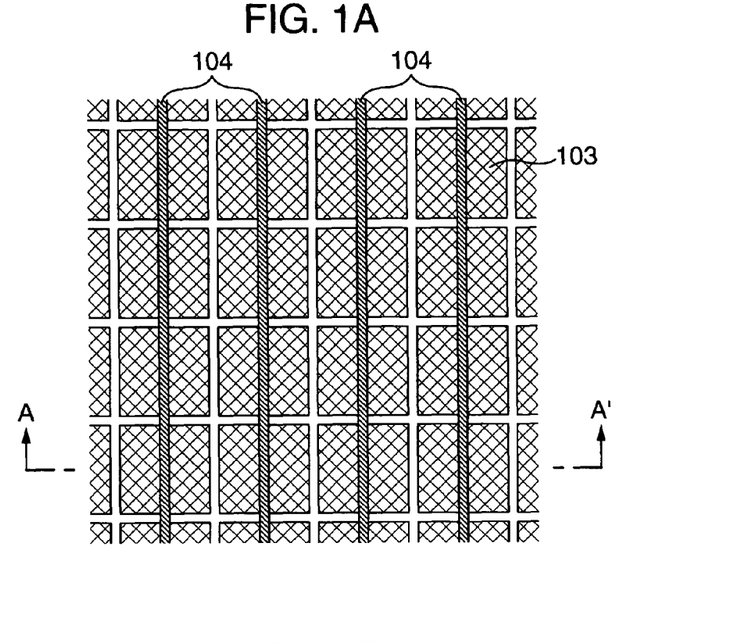
FIG. 1A is a top plan view generally illustrating the structure of an image display apparatus according to the present invention.
Figure 1B:
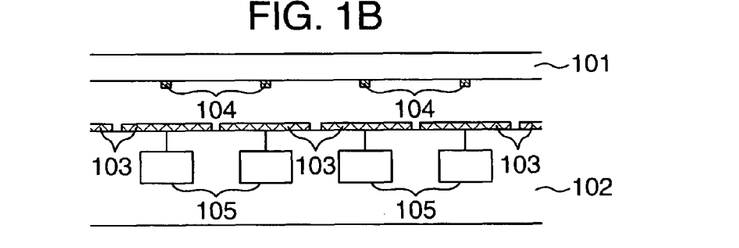
FIG. 1B is a cross-sectional view of the image display apparatus illustrated in FIG. 1A, taken along a section line A-A'.

FIGS. 1A and 1B generally illustrate the structure of an image display apparatus according to the present invention, where FIG. 1A is a plan view of the image display apparatus, and FIG. 1B is a cross-sectional view of substrates taken along a section line A-A'. Electrodes 104 are disposed in a striped pattern on the inner surface of a light-transmissive front substrate 101. Pixel electrodes 103 are disposed on the inner surface of a back substrate 102 opposite to the striped electrodes 104 for forming respective pixels. The pixel electrodes 103 are arranged, together with particle drive units (particle drivers) 105 associated therewith, in a two-dimensional layout. Each of the striped electrodes 104 has a width smaller than that of the associated pixel electrode 103 disposed on the substrate 102 on the cross-section of the substrates 102, 103 along the section line A-A'.

Figure 2A:
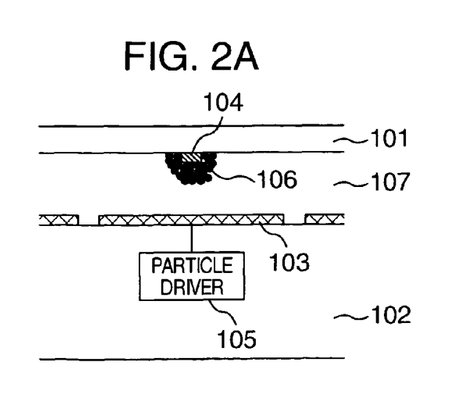
FIGS. 2A and 2B are cross-sectional views for explaining the principle of the image display apparatus according to the present invention as to how an image is displayed.
Figure 2B:
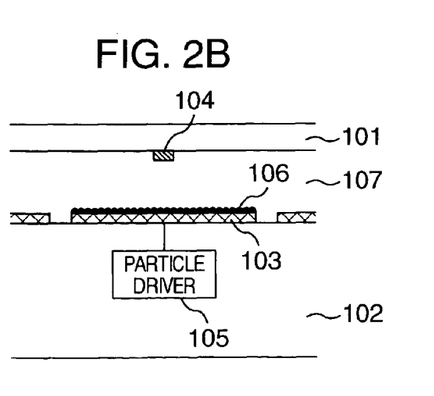

In addition, as illustrated in FIGS. 2A and 2B, a light-transmissive fluid 107, which serves as electrophoretic medium, and colored particles with zeta potential 106, which serve as electrophoretic particles, are filled in a space between the light-transmissive front substrate 101 and the back substrate 102. By the action of the particle drive unit 105, the colored particles with zeta potential 106, which are electrophoretic particles, within the light-transmissive fluid 107 are moved to modulate the reflectance on a pixel-by-pixel basis for displaying an image. Here, the striped electrode 104 is applied with a constant voltage, while the pixel electrode 103 is applied with a positive potential and a negative potential, with respect to the voltage applied to the striped electrode 104, which are switched by the action of the particle drive unit 105, causing the colored particles with zeta potential 106 to move to the striped electrode 104 or pixel electrode 103.

As illustrated in FIG. 2A, as the colored particles with zeta potential 106 move to the striped electrode 104, the associated pixel presents the color of the pixel electrode 103 or back substrate 102. Here, when the pixel electrode 103 or back substrate 102 has a high reflectance over the whole area of visible spectrum, white is displayed. Then, as the colored particles with zeta potential 106 move onto the pixel electrode 103 as illustrated in FIG. 2B, the display can be switched to the color of the particles 106. For example, when the colored particles of zeta potential 206 exhibit a high absorbance over the whole area of visible spectrum, the light is absorbed so that black is displayed.

In the manner described above, the present invention can modulate the reflectance on a pixel-by-pixel basis to display an image, and the simple structure of the pixels facilitates the manufacturing and higher resolution by micromachining.

In the present invention, the light-transmissive fluid may be a colorless liquid such as water, alcohol, oil, and the like, while the colored particles with zeta potential may be charged pigments in a desired color. For example, a black and white display device can be provided using black colored particles with zeta potential. In addition, an image display device can be provided for presenting a color in accordance with the absorption spectrum of particular colored particles of zeta potential.

In the image display apparatus of the present invention, when the pixel electrodes 103 are made of a conductive material which reflects the visible light, the pixel electrodes 103 also serve as reflectors, and the resulting display apparatus provides parallax-free high definition display. The conductive material which reflects the visible light, used herein, may be a single metal material or a combination of metal materials such as Al, Ag, Cr, Mo, Au, Ni, Cu, and the like. This reflecting surface may be formed with a proper concave-convex surface texture to make reflected light diffusive. This diffusive reflecting surface can set a desired diffusion area for reflected light with its concave-convex surface texture, and can provide a high luminance image in a proper range by narrowing down the diffusive area.

Further, for enhancing the brightness to generate a reflection color close to pure white when white is displayed, the reflecting surface may be coated with fluorescent brightening agents which absorb ultraviolet light and emit visible light. The fluorescent brightening agents for use herein may be an element or a combination of diaminostilbene, imidazoles, imidazolone, toriazoles, thiazol, oxazoles, oxadiazoles, coumarins, naphthalimid, and the like.

The striped electrodes 104 can be made of any conductive material such as Al, Ag, Cr, Mo, Au, Ni, Cu, and the like. In this event, the same color as the colored particles with zeta potential is preferably selected for the striped electrodes 104, because the particles coated over the pixel electrodes 103 can improve the display characteristics in the particle color display state to enhance the contrast ratio. For example, when the particles are black, the light-transmissive front substrate 101 may be previously formed with a black thin film substantially in the same flat shape before the striped electrodes 104 are formed thereon.

Further, the striped electrodes 104 are preferably made of a light-transmissive conductive material such as ITO, IZO, $SnO_2$, or the like, because the contrast ratio can be improved by a similar effect without forming a thin film in the same color as the colored particles with zeta potential.

Figure 17:
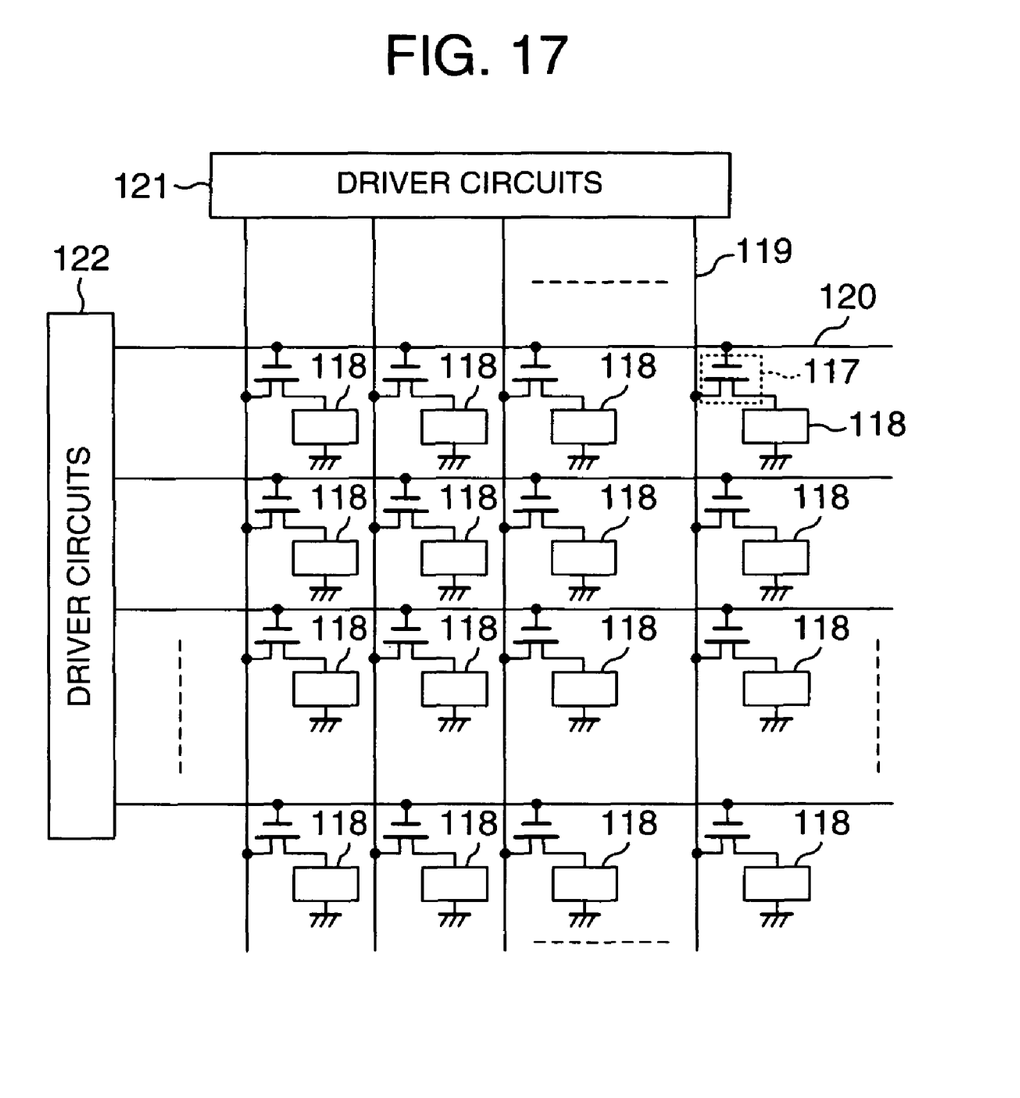
FIG. 17 is a diagram illustrating driver circuits for use in the image display apparatus according to the present invention.

The particle drive unit 105 may be implemented by a combination of transistors formed on a silicon substrate or thin film transistors formed on a substrate made of glass, plastic or the like, and arranged in matrix. For example, as illustrated in FIG. 17, thin film transistors 117 made of such a material as amorphous silicon or polycrystalline silicon may be arranged in matrix, such that the transistors 117 are driven by drivers 121, 122, respectively, through drain lines 119 and gate lines 120 to control movements of the particles in the pixel cells 118 to display an image.

Referring again to FIG. 2, the spacing between the light-transmissive front substrate 101 and back substrate 102 may be maintained by dispersing beads, forming pillars between pixels, and the like. In the structure illustrated in FIG. 2, the colored particles with zeta potential 106 dispersed in the light-transmissive fluid 107 may flow among the pixels to cause cross-talk and distortion of image within the screen. For preventing these disadvantages, partitions 108 may be formed between pixels, as illustrated in FIG. 3.

Figure 3A:
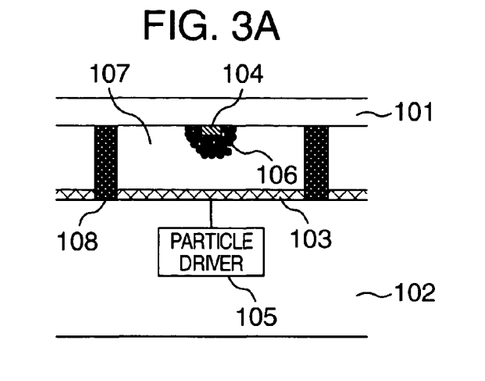
Figure 3B:
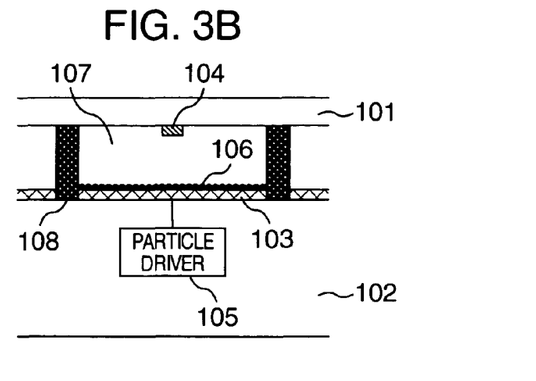
Figure 9:
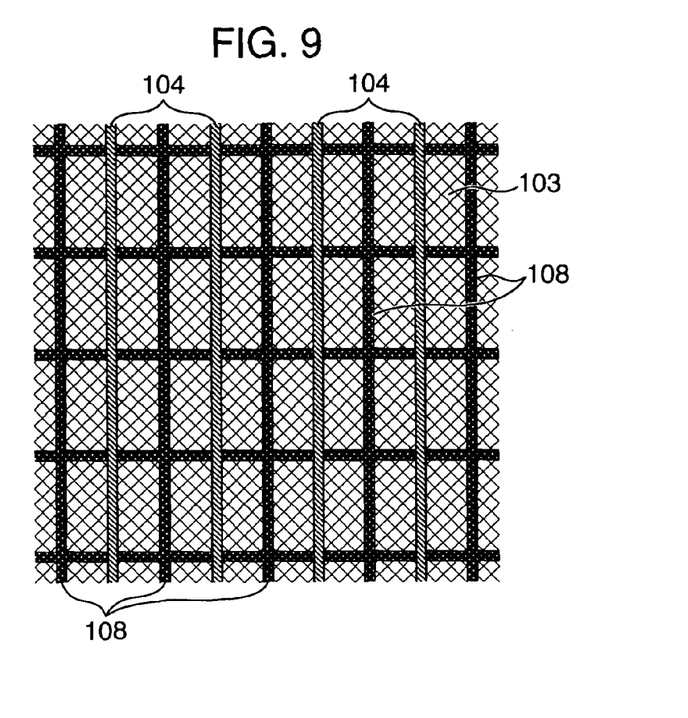
FIG. 9 is a top plan view generally illustrating the structure of another image display apparatus according to the present invention.
Figure 10:
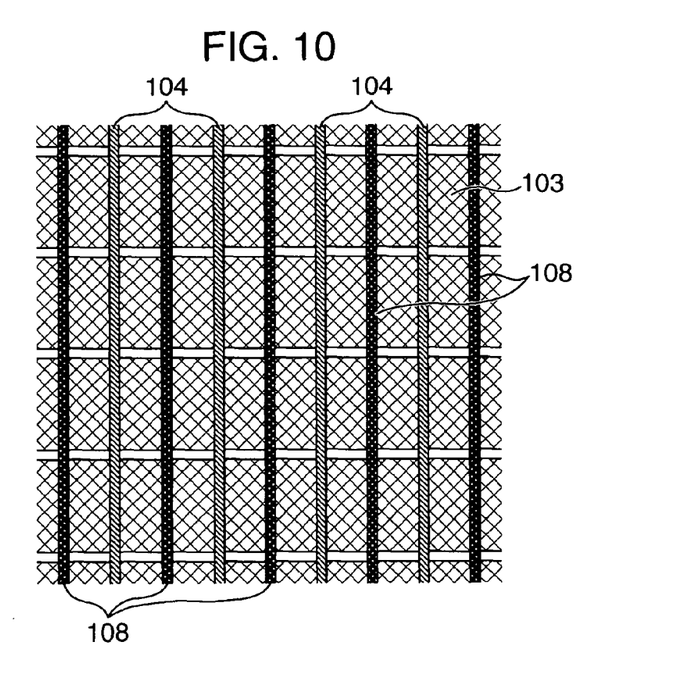
FIG. 10 is a top plan view generally illustrating the structure of a further image display apparatus according to the present invention.

In regard to the structure the partitions 108 in FIG. 3, as seen in a top plan view, gridded partitions 108 may be formed on a pixel-by-pixel basis to isolate the pixel electrodes 103, as illustrated in FIG. 9. Alternatively, striped partitions 108 may be effectively formed to isolate the striped electrodes 104, as illustrated in FIG. 10. Also, while the partitions 108 are formed at the same pitch as the pixels, the partitions 108 may be effectively formed at a pitch which is an integer multiple of the pitch of the pixels. In addition, when the same color as the particles is selected for the partitions 108, the display characteristics are improved for the particle color display state, with an additional advantage of enhancing the contrast ratio.

Figure 4A:
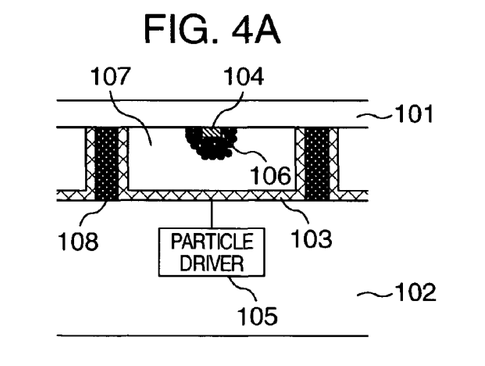
Figure 4B:
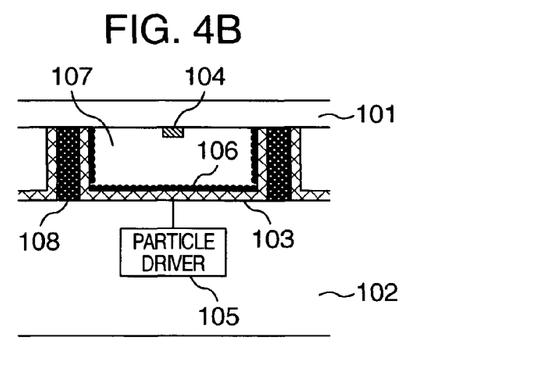

Further, as illustrated in FIG. 4, when the side surfaces of the partitions 108 are made conductive so that they can also be used as the pixel electrodes 103, the contrast ratio and image switching speed are increased. By the action of the particle drive unit 105, the voltage applied to the pixel electrodes 103 is switched to smoothly switch a background color display state in which the colored particles with zeta potential are concentrated on the striped electrodes 104 to exhibit the color of the back substrate 102 as illustrated in FIG. 4A, to a particle color display state in which the pixel electrodes 103 are covered with the colored particles with zeta potential as illustrated in FIG. 4B.

Describing the result of an electric field simulation about this phenomenon with reference to FIGS. 16A to 16K, FIGS. 16A and 16B illustrate how an electric field is generated in each pixel when a potential difference is applied between the striped electrode 104 and the pixel electrode 103, respectively, in the structure illustrated in FIG. 2 and in the structure illustrated in FIG. 3 in which the partitions 108 are provided but without conductivity on its side surfaces. Curves represent electric equipotential lines. In either case, the electric equipotential lines run toward the inside, i.e., toward the back substrate, from the center to the ends of the pixel electrode 103, showing that sufficient assist particle dispersion is not always provided when the colored particles with zeta potential concentrating on the striped electrode 104 move toward the pixel electrode 103.

Figure 16A:
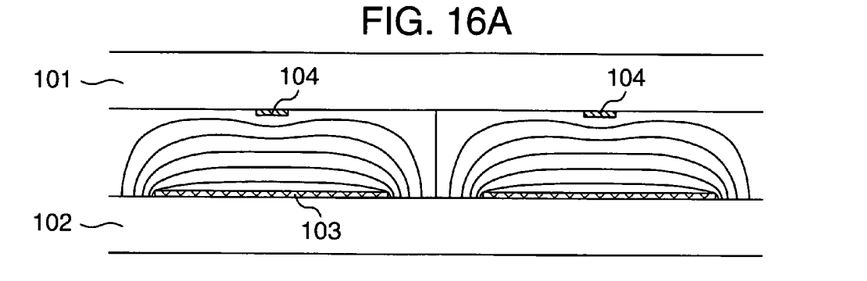
Figure 16B:
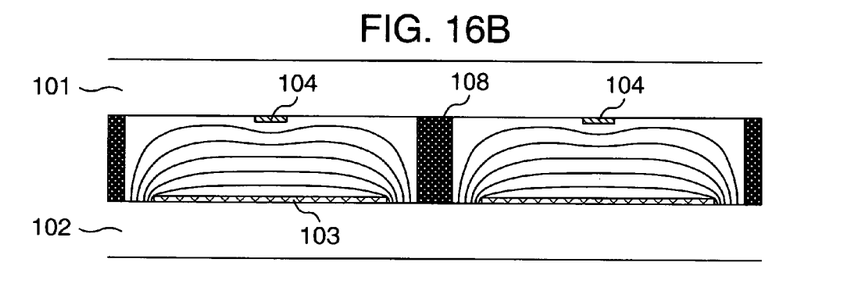
Figure 16C:
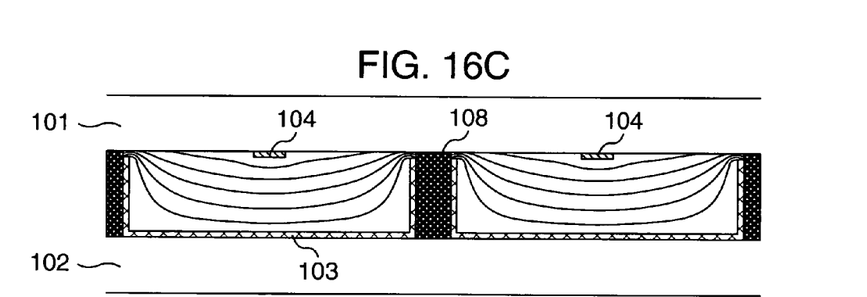

On the other hand, referring to FIG. 16C which illustrates how an electric field is generated when the side surfaces of the partitions 108 shown in FIG. 4 are made conductive, the electric equipotential lines run toward outside, i.e., toward the front substrate 101, from the center to the ends of the pixel electrode 103, so that charged particles will sufficiently cover over the pixel electrode 103 with the aid of the large dispersion electric field. The response time is also improved. This results in an improved particle color display state and an associated improvement in contrast ratio and a higher frame rate.

In the background color display state as illustrated in FIG. 4A, it is important to efficiently collect the colored particles with zeta potential 106 on the striped electrode 104. The colored particles with zeta potential 106 swelling out the striped electrode 104 would conceal the background, resulting in a lower contrast ratio.

Figure 5A:
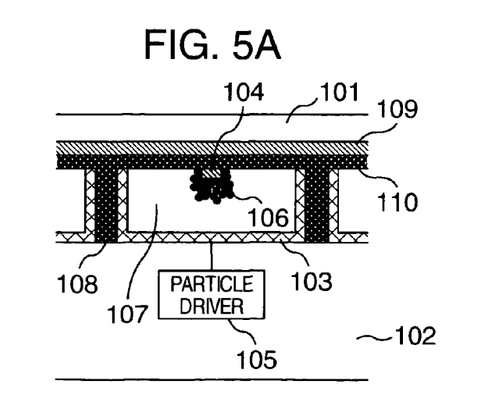
Figure 5B:
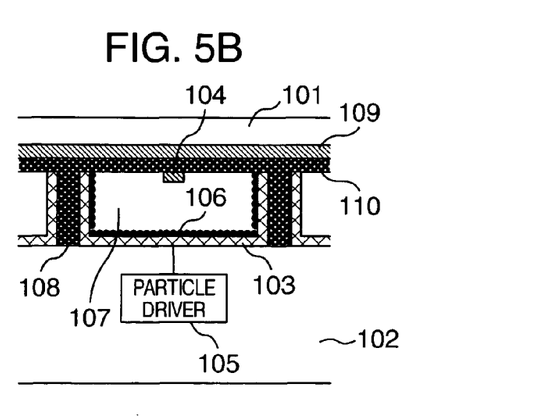

The lower contrast ratio caused by the foregoing is improved by providing a uniform light-transmissive conductive layer 109 on the light-transmissive front substrate 101, and an insulating layer 110 on the electrodes 104, serving as a dielectric, between the substrate 101 and the striped electrode 104 to maintain both at the same potential, as illustrated in FIG. 5. Consequently, the colored particles with zeta potential 106 are efficiently collected on the striped electrode 104, and a less amount of particles swells out the electrode 104, leading to an improved contrast ratio.

Figure 16D:
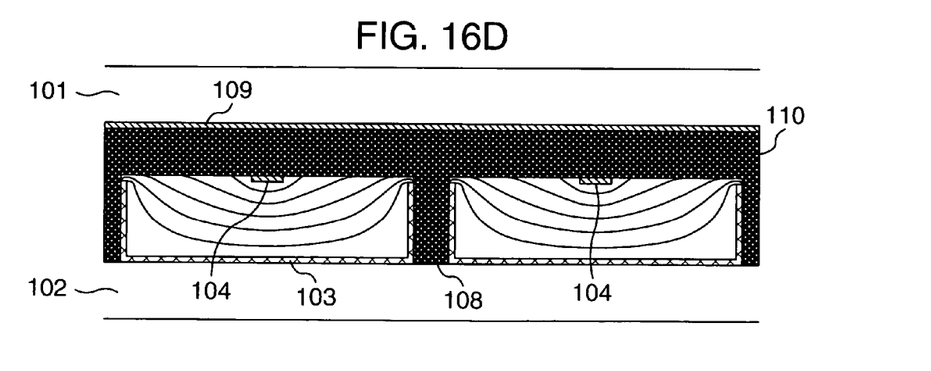

According to an electric field simulation, the structure illustrated in FIG. 5 causes the electric equipotential lines to largely curve inwardly, i.e., toward the front substrate 101 near the striped electrode 104, as illustrated in FIG. 16D, thus tending to collect more charged particles, as compared with FIG. 16C which corresponds to the structure in FIG. 4. This effect of collecting charged particles by the bent electric field is produced when the insulating layer 110 has a thickness of several hundreds of nanometers, and becomes sufficiently large when the thickness is 1 mm or more.

Figure 6A:
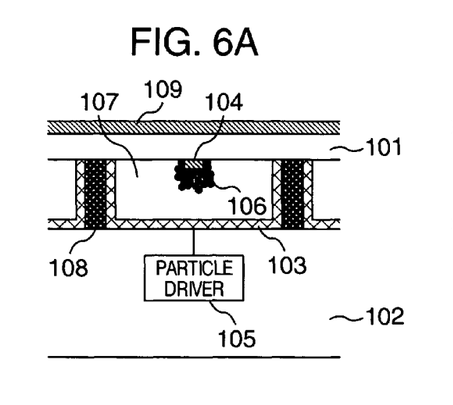
Figure 6B:
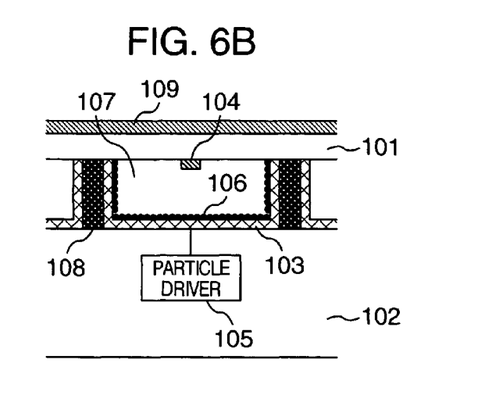

Thus, from the fact that the same effect is produced even when there is a wider spacing between the uniform transparent electrode 109 and the striped electrode 104, the insulating layer 110 may be removed, such that the function of the insulating layer 110 is taken over to the light-transmissive front substrate 101, and the uniform transparent electrode 109 may be formed on the surface of the light-transmissive front substrate 101, as illustrated in FIG. 6, with a similar effect produced therefrom.

Figure 16E:
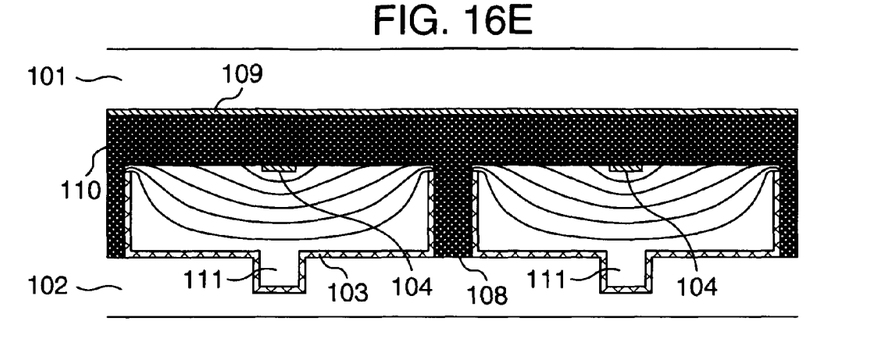
Figure 16F:
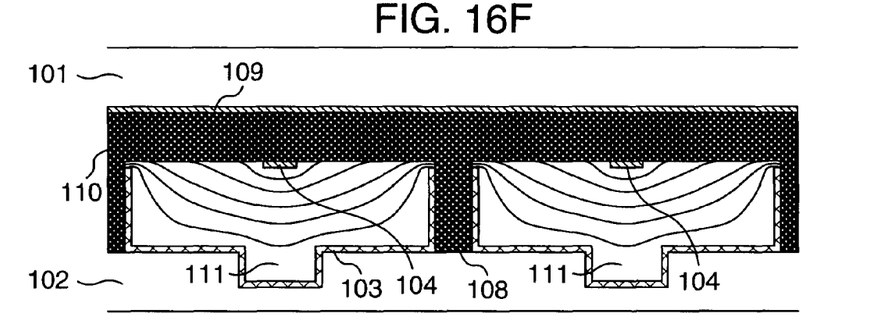
Figure 16G:
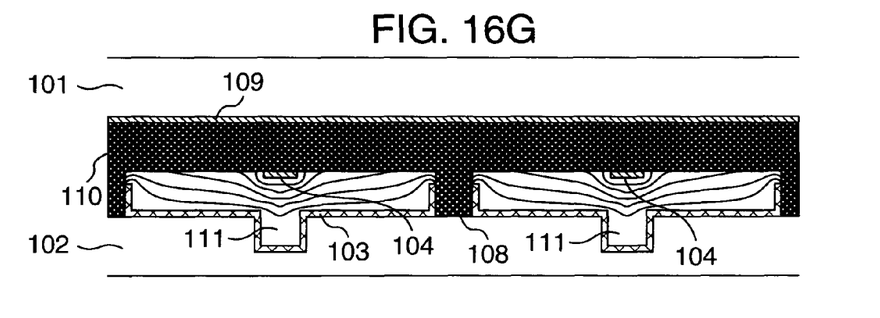
Figure 16H:
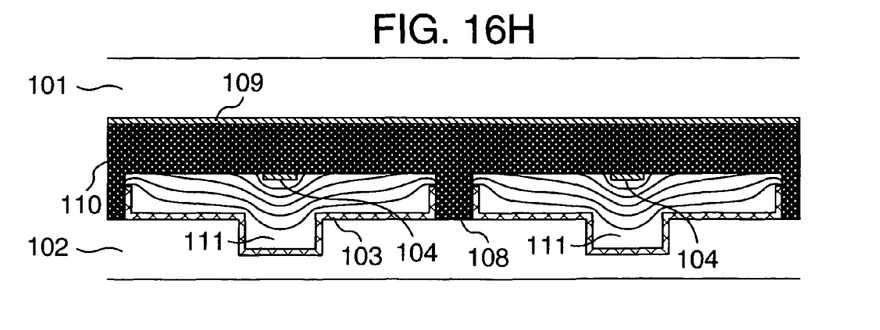
Figure 16I:
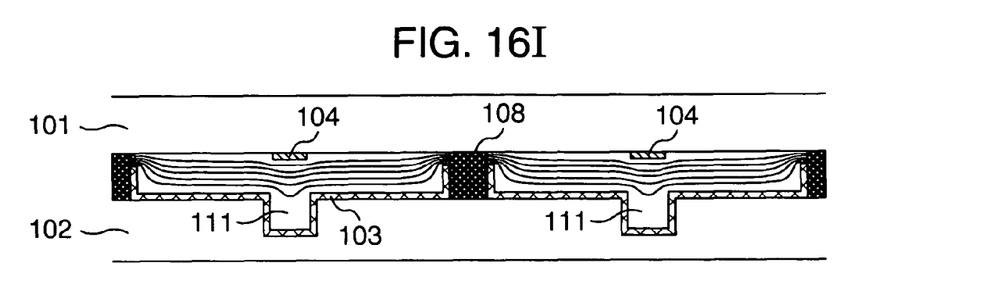
Figure 16J:
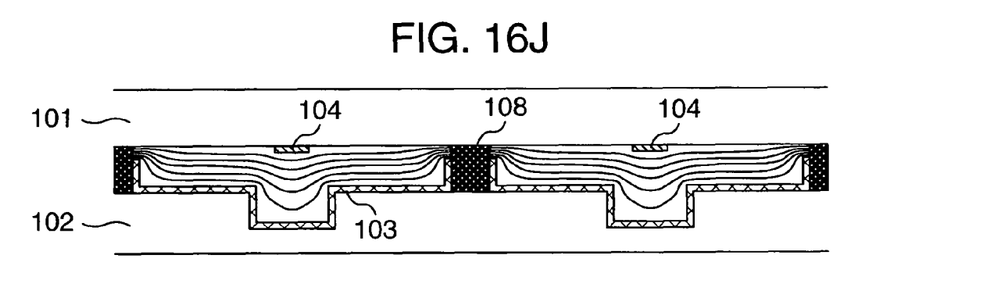
Figure 16K:
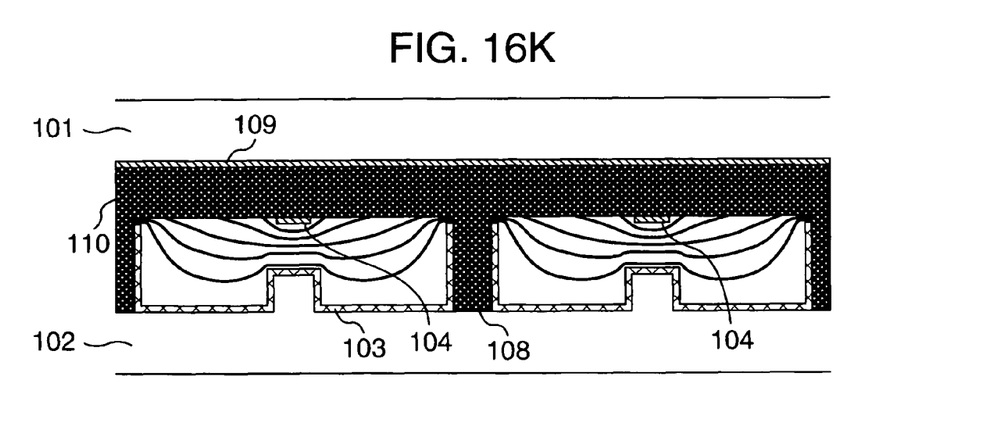

While the electrodes 103, 104 are flat in FIGS. 16A to 16D, FIGS. 16E to 16I show the results of electric field simulations, for example, when a contact hole 111 is formed opposite to each electrode 104 for connecting the electrode 103 to the particle drive unit 105, and FIG. 16K shows the result of an electric field simulation when the electrode 103 is made convex.

Like FIG. 16D, FIG. 16E shows that there is no unnecessary bend of the electric field which causes narrower spacings between the electric equipotential lines on the electrode 104, as illustrated in FIG. 16K. The reflectance is not reduced either. FIG. 16F in turn shows the result of an electric field simulation when the contact hole in FIG. 16E is increased in width, presenting electric equipotential lines similar to those in FIGS. 16D, 16E.

Thus, desired electric equipotential lines are widely spaced apart from each other over the electrode 104, and suddenly bend upward near the ends of the electrode 104. Such electric equipotential lines can condense more charged particles on the electrode 104 to improve the reflectance.

FIGS. 16G and 16H, which correspond to FIGS. 16E and 16F, respectively, show desired equipotential lines which can be achieved by reducing a cell gap between the electrodes 103 and 104. In FIG. 16H, the electric field is generated even within the contact hole 111, thereby preventing charged particles from staying in the contact hole 111. Such desired electric equipotential lines are similar as well in FIGS. 16I, 16J in which the transparent electrode 109 and insulating layer 110 are removed, wherein the electric equipotential lines are spaced apart more from each other particularly over the electrode 104. Also, the cell gap is preferably equivalent to the width of the contact hole 111.

Figure 7A:
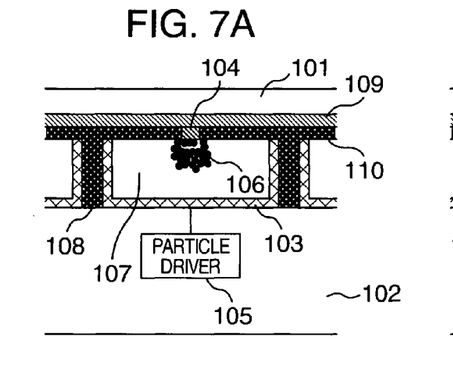
Figure 7B:
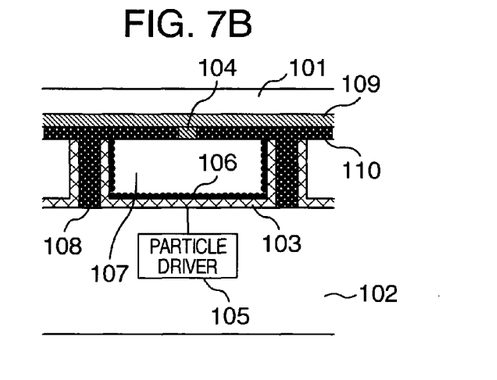

FIG. 7 illustrates a structure which includes an insulating layer 110 having a recess and serving as a dielectric; a striped electrode 104 surrounded by the insulating layer 110 and disposed in the recess; and a transparent electrode 109. A desired structure of electric field can be generated as well when the striped electrode 104 is brought into contact with the transparent electrode 109 in order to place both the electrodes 104, 109 at the same electric potential. In this structure, the electrode 104 need not be in a striped pattern, but may be discretely placed substantially at the center of each pixel, as illustrated in top plan views of FIGS. 11 and 12.

Figure 11:
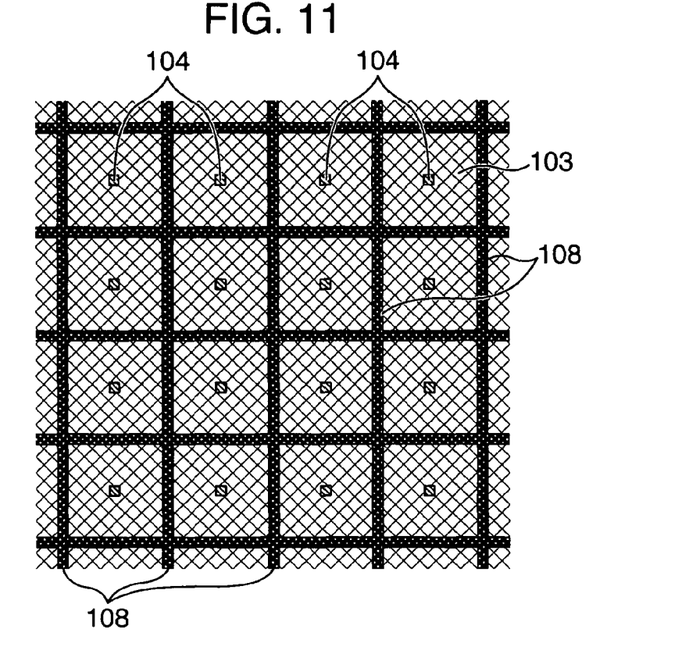
FIG. 11 is a top plan view generally illustrating the structure of a further image display apparatus according to the present invention.
Figure 12:
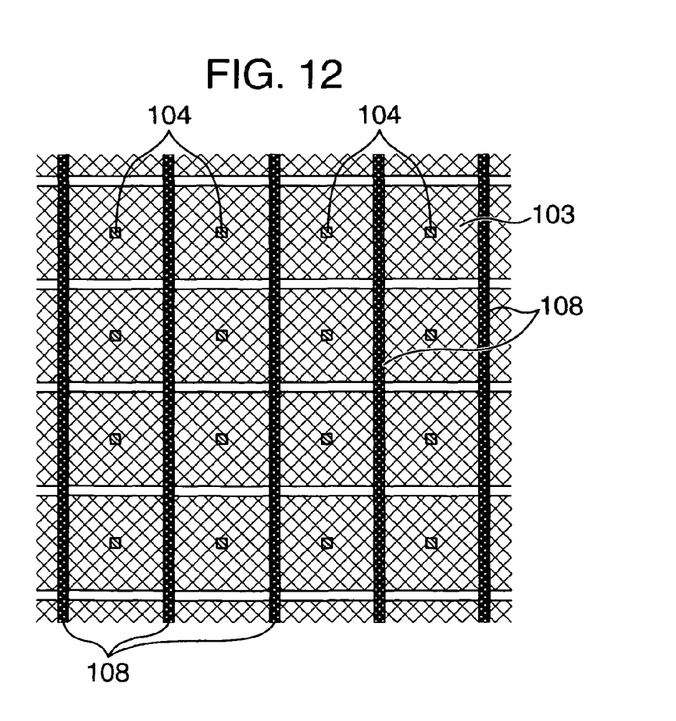
FIG. 12 is a top plan view generally illustrating the structure of a further image display apparatus according to the present invention.

Consequently, a region covered with the particle color is further reduced in a background color displayed on the screen, resulting in a significant improvement in contrast ratio. Here, the discrete electrodes 104 isolated by partitions 108 are not limited in shape to a square as illustrated in FIGS. 11 and 12, but may be in another shape such as a circle. The importance lies in that the discrete electrode is formed substantially at the center of each pixel within the plane isolated by the partitions.

Figure 8A:
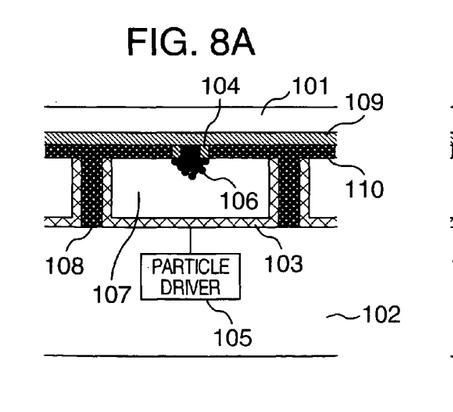
Figure 8B:
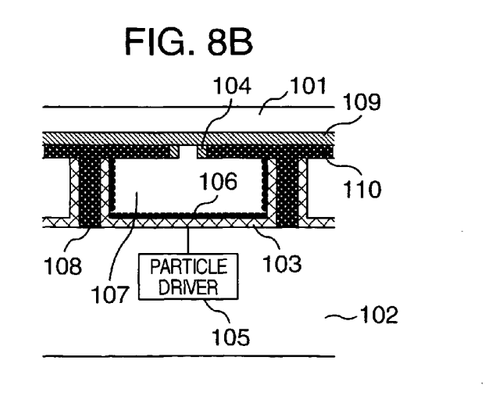

Also, as illustrated in FIG. 8A, 8B, the electrode 104 may be formed with a groove in the insulating layer, or the discrete electrode 104 may be formed with an opening in the insulating layer, such that the colored particles with zeta potential 106 can be collected in the groove or opening to further improve the contrast ratio.

In the image display apparatus so far described, a gray scale is preferably displayed in accordance with an area ratio gray scale.

Figure 13A:
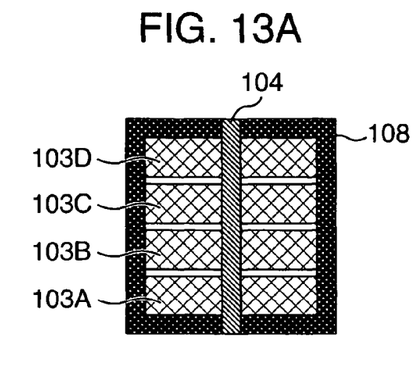
FIGS. 13A and 13B are top plan views each illustrating the structure of a pixel in the image display apparatus according to the present invention.

As illustrated in FIG. 13A, the area ratio gray scale can be implemented by dividing the pixel electrode 103 into sub-pixel electrodes 103A-103D perpendicular to the striped electrode 104. In this structure, the colored particles with zeta potential 106 are independently moved on the divided sub-pixel electrodes 103A-103D to accomplish the area ratio gray scale.

While the pixel electrode 103 may be equally divided into the sub-pixel electrodes 103A-103D having the same width, the sub-pixel electrodes 103A-103D may have different widths from one another. In this structure, a larger number of levels can be provided for the gray scale display because a different amount of light is reduced as the colored particles with zeta potential 106 move to a particular sub-pixel electrode or a particular reflecting surface of the sub-pixel electode. For example, when the pixel electrode 103 is equally divided into four sub-pixel electrodes 103A-103D as illustrated in FIG. 13A, five levels of gray scale can be provided from 0 to 1 in increments of $1/4$ (0, $1/4$, $1/2$, $3/4$, 1) because one quarter of light is reduced when the colored particles with zeta potential 106 move to each of the sub-pixel electrodes 103A-103D.

Figure 13B:
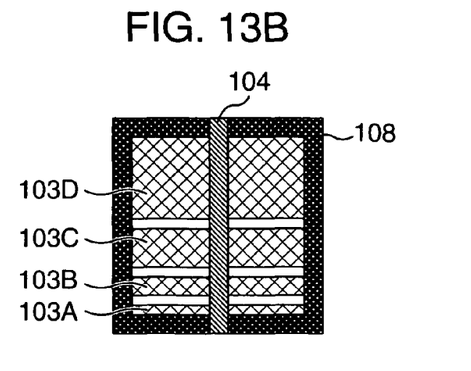

In FIG. 13B, on the other hand, as one pixel electrode 103 is divided in a ratio of 1:2:4 ($=2^2$): 8 ($=2^3$), the resulting image display apparatus can advantageously provide 16 levels of gray scale in increments of $1/15$ (0, $1/15$, ..., $14/15$, 1) because the respective sub-pixel electrodes 103A-103D contribute to the reduction in the amount of light by $1/15$, $2/15$, $4/15$, and $8/15$, respectively. As one pixel electrode is divided into N sub-pixel electrodes, each of which has a different width from one another in the foregoing manner, the resulting image display apparatus can provide $2^N$ levels of gray scale in display.

Figure 14:
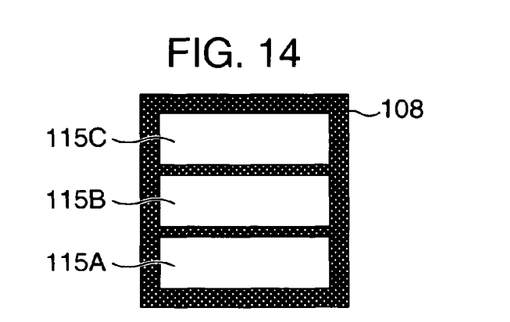
FIG. 14 is a top plan view illustrating the structure of a pixel for displaying a color image.

As illustrated in FIG. 14, the image display apparatus according to the present invention may be modified to display a color image by providing one pixel with three color display areas 115A-115C for displaying three colors, i.e., red, green, and blue, respectively. In this structure, the colored particles with zeta potential should be black, the reflecting surface comprised of the back substrate or pixel electrodes should exhibit substantially a uniform reflectance over the entire visible color range, and color filters for transmitting red, green, and blue should be provided for the respective color display areas. When the color filters are not employed, the reflecting surface itself may reflect red, green, and blue in accordance with the respective color display areas.

For ensuring that the reflecting surface exhibits substantially a uniform reflectance over the entire visible light range without the employment of the color filters, the light-transmissive fluid may transmit only red, green, or blue in accordance with each color display area, with the employment of black particles with zeta potential.

Figure 15:
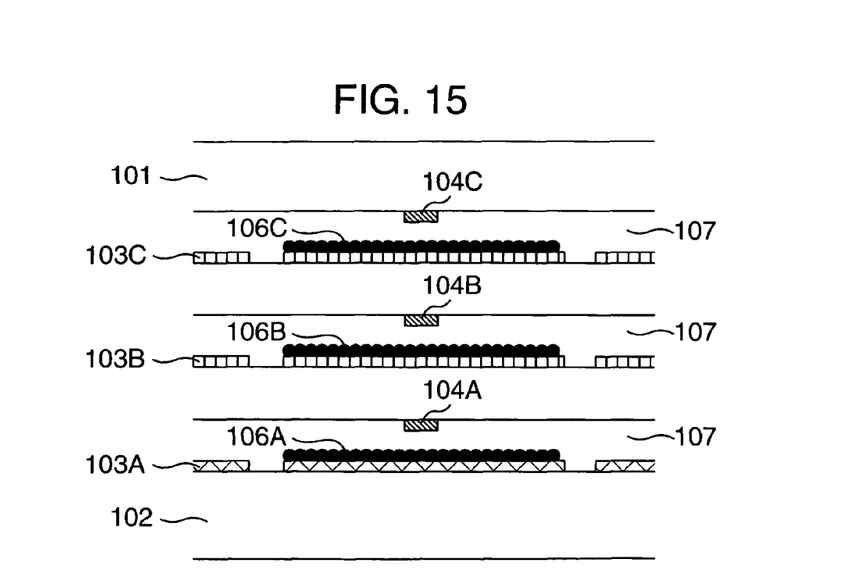
FIG. 15 is a cross-sectional view illustrating the structure of a pixel for displaying a color image.

Alternatively, the color image display apparatus can be implemented as well by a three-layered laminate structure as illustrated in FIG. 15. In this structure, only a lowermost electrode 103A has a reflecting surface within three electrodes 103A-103C, while the two upper electrodes 103B, 103C and the front substrate 101 are light-transmissive. When colored particles with zeta potential 106A, 106B, 106C employed herein only absorb red, green, and blue, respectively, a full color display can be accomplished by movements of the particles in the three layers.

First Embodiment

Now, a preferred embodiment of the image display apparatus according to the present invention will be described with reference to FIGS. 5 and 10.

As illustrated in FIG. 10, the image display apparatus of this embodiment comprises pixel electrodes 103 which are arranged in a two-dimensional layout at intervals of 50 mm; striped partitions 108 which partition the pixels; and striped electrodes 104, each of which passes through substantially the center of each pixel.

FIG. 5 illustrates a cross-sectional view of the image display apparatus in FIG. 10. A transparent electrode 109 made of an ITO light-transmissive conductive film; an insulating layer 110 made of an organic polymer having a thickness of 2 mm; and the striped electrodes 104 have been formed on a light-transmissive front substrate 101.

On a back substrate 102 which has been formed with particle drive units 105 in a two-dimensional layout, striped partitions 108 are formed to have a height of 5 mm. The back substrate 102 is coated with a highly reflective metal material over the partitions 108 to form pixel electrodes 103. Spaces divided by the partitions 108 are filled with a light-transmissive fluid 107 dispersed with colored particles with zeta potential 106, before the back substrate 102 is sealingly integrated with the front substrate 101 to complete the image display apparatus.

In this image display apparatus, the colored particles with zeta potential 106 dispersed in the light-transmissive fluid 107 move, as illustrated in FIG. 5, to provide a black-and-white display on a pixel-by-pixel basis by maintaining the striped electrodes 104 and transparent electrode 109 commonly at zero volt, and modulating the pixel electrodes 103 by ±10 volts by the action of the particle drive unit 105.

Here, the particle drive unit 105 may be formed, for example, of such a material as amorphous silicon, polycrystalline silicon, or the like. As illustrated in FIG. 17, thin-film transistors 117 are arranged in matrix to control the movement of charged particles associated with pixel cells 118 to display an image. The thin-film transistors 117 are controlled by driver circuits 121, 122 through drain lines 119 and gate lines 120.

The colored particles with zeta potential suitable for use in this image display apparatus may be any of various pigments which are charged by any technique. For example, for black-and-white display, a light-transmissive fluid may be dispersed with carbon to provide a black fluid which may be used for the image display apparatus.

The light-transmissive fluid suitable for use in the image display apparatus may be any transparent liquid such as water, alcohol, oil, and the like.

The pixels are preferably isolated by the partitions as is the case with the foregoing embodiment, because the resulting image display apparatus can avoid disturbance due to movements of the particles among the pixels.

The pixel electrodes 103 are more preferably made of a metal material having a high reflectance in the visible light range, such as Al, Ag, Au, and the like, because the pixel electrodes 103 can additionally serve as the reflecting surface. In this event, the electrodes may be preferably formed with a miniature concave-convex surface texture to provide a diffusive reflecting surface which makes reflected light diffusive. This diffusive reflecting surface can set a desired diffusion area for reflected light with its concave-convex surface texture, and can provide a high luminance image in a proper range by narrowing down the diffusive area.

Second Embodiment

Another preferred embodiment of the image display apparatus according to the present invention will be described with reference to FIGS. 8 and 11.

Referring first to FIG. 11, the image display apparatus in this embodiment comprises pixels, arranged in a two-dimensional layout, each of which is comprised of a pixel electrode 103 and a discrete electrode 104. Unlike the first embodiment, the discrete electrode 104 is formed in each pixel, and the pixels are isolated by partitions 108. As illustrated in FIG. 8, in the image display apparatus, a transparent electrode 109 and an insulating layer 110 are formed on a light-transmissive front substrate 101. Then, the insulating layer 110 is formed with openings which extend therethrough to reach the transparent electrode 109. Subsequently, the discrete electrodes 104 are formed within the openings in a two-dimensional layout.

The discrete electrodes 104 and openings are not limited in shape to a square as illustrated in FIGS. 11 and 12, but may be in another shape such as a circle. The importance lies in that the discrete electrode is formed substantially at the center of each pixel. In a manner similar to the first embodiment, a back substrate 102 is formed with particle moving units 105, partitions 108, and pixel electrodes 103 in a two-dimensional layout. The back substrate 102 is filled with a light-transmissive fluid 107 dispersed with a colored particles with zeta potential 106. Then, the back substrate 102 is sealingly integrated with the front substrate 101 to complete the image display apparatus.

As compared with the first embodiment, the image display apparatus of the second embodiment has the respective pixels isolated vertically and horizontally by the partitions 108, contributing to reduced disturbance of the colored particles with zeta potential 106 among the pixels. Since the discrete electrodes 104 have a small area, the particles concentrate in a small space to increase an aperture ratio in a white display state. Thus, the resulting image display apparatus exhibits a high reflectance and a high contrast ratio.

Figures 18A, 18B:
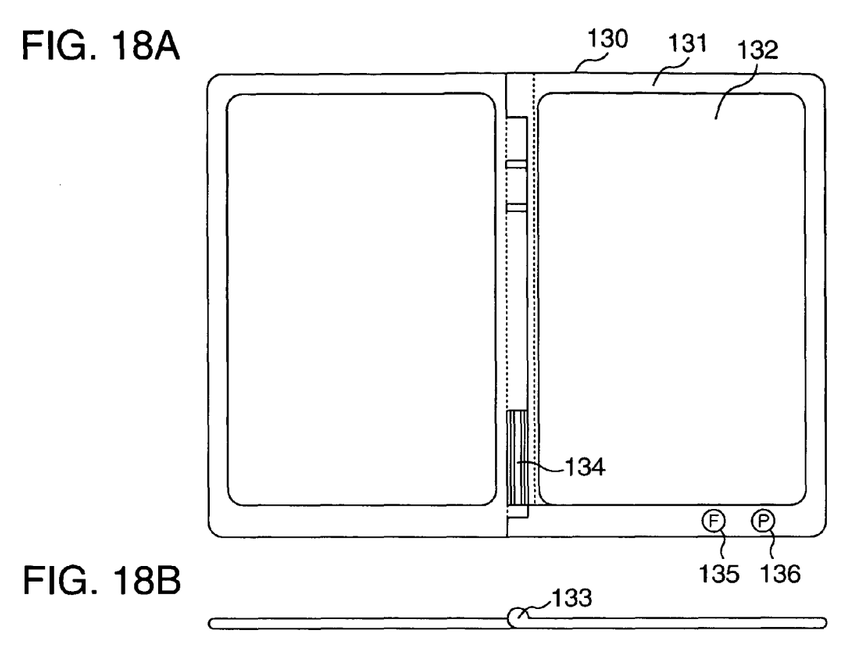
Figure 18C:
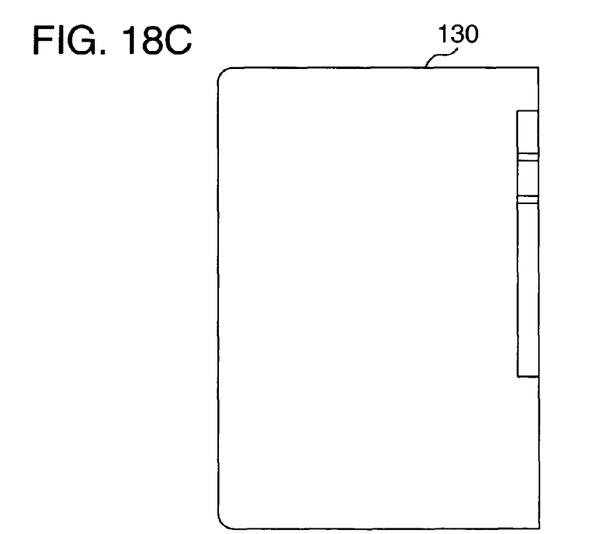
Figure 18D:
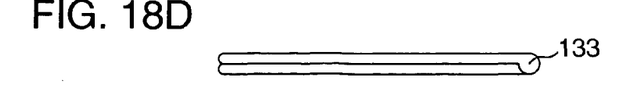

FIGS. 18A to 18D illustrate a portable reader which embodies the image display apparatus according to the present invention, wherein a display unit 132 is provided within a display frame 131 of a body 130. The image display apparatus according to the present invention is employed for the display unit 132. FIG. 18A illustrates the portable reader, when it is opened, which has a width of approximately 204 mm and a length of approximately 151 mm, by way of example. FIG. 18B is a bottom view of the portable reader illustrated in FIG. 18A, which has a thickness of approximately 3 mm, by way of example. FIG. 18C illustrates the portable reader, when it is closed, which has a width of approximately 105 mm, and a length of approximately 151 mm, by way of example. FIG. 18D is a bottom view of the closed portable reader illustrated in FIG. 18C, which has a thickness of approximately 6 mm, by way of example. The body 130, which can be opened and closed about a central shaft 133, comprises a page turning button 134 manipulated by a finger to the left or the right to forward or return pages; a function button 135 for selecting a function; and a power button 136 for powering on/off the portable reader.

As described above, the present invention provides an image display apparatus which facilitates the manufacturing, provides a high luminance, a high reflectance, and a high contrast ratio, and can be rapidly driven, thus achieving the intended object.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An image display apparatus comprising:
a first substrate formed with first electrodes;
a second substrate disposed opposite to said first substrate and formed with second electrodes; and
electrophoretic particles and a solvent encapsulated between said first substrate and said second substrate, wherein:
each electrode belonging to said first electrodes has a width smaller than each electrode belonging to said second electrodes in at least one direction on the plane of said first substrate,
said second electrodes are applied with a voltage which is modulated independently on a pixel-by-pixel basis,
said first electrodes are applied with a constant voltage,
the image display apparatus is an active-matrix type display,
a third electrode or third electrodes are disposed on said first substrate opposite to said second electrodes with respect to said first electrodes so as to be disposed between said first substrate and said first electrodes, said third electrode or electrodes have a width wider than the width of each electrode belonging to said first electrode, and said third electrode or electrodes are applied with the same electric potential as said first electrodes, and
an insulating layer formed on said first substrate for serving as a dielectric, said insulating layer having recesses for surrounding said first electrodes associated therewith, said first electrodes are provided within said recesses, and a distance between said first electrode and said second substrate is equal to a width of the contact hole.

2. An image display apparatus comprising:
a first substrate formed with first electrodes;
a second substrate disposed opposite to said first substrate and formed with second electrodes; and
electrophoretic particles and a solvent encapsulated between said first substrate and said second substrate, wherein:
each electrode belonging to said first electrodes has a width smaller than each electrode belonging to said second electrodes in at least one direction on the plane of said first substrate,
said second electrodes are applied with a voltage which is modulated independently on a pixel-by-pixel basis,
said first electrodes are applied with a constant voltage,
the image display apparatus is an active-matrix type display,
a third electrode or third electrodes are disposed on said first substrate opposite to said second electrodes with respect to said first electrodes so as to be disposed between said first substrate and said first electrodes, said third electrode or electrodes have a width wider than the width of each electrode belonging to said first electrode, and said third electrode or electrodes are applied with the same electric potential as said first electrodes,
said second electrode includes a fixed width contact hole, and
a distance between said first electrode and said second electrode is equal to a width of the contact hole.

3. An image display apparatus according to claim 2, wherein each electrode belonging to said second electrodes has a concave surface texture.

4. An image display apparatus according to claim 2, wherein each electrode belonging to said first electrodes is made of a light-transmissive material.

* * * * *